(12) United States Patent
Gao et al.

(10) Patent No.: US 10,551,716 B2
(45) Date of Patent: Feb. 4, 2020

(54) LENS DEVICE

(71) Applicant: BOE TECHNOLOGY GROUP CO., LTD., Beijing (CN)

(72) Inventors: Jian Gao, Beijing (CN); Xue Dong, Beijing (CN); Xiaochuan Chen, Beijing (CN); Yafeng Yang, Beijing (CN); Wei Wang, Beijing (CN); Jifeng Tan, Beijing (CN); Xiandong Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/742,896

(22) PCT Filed: Jul. 7, 2017

(86) PCT No.: PCT/CN2017/092175
§ 371 (c)(1),
(2) Date: Jan. 9, 2018

(87) PCT Pub. No.: WO2018/045812
PCT Pub. Date: Mar. 15, 2018

(65) Prior Publication Data
US 2018/0231867 A1 Aug. 16, 2018

(30) Foreign Application Priority Data
Sep. 8, 2016 (CN) .......................... 2016 1 0811703

(51) Int. Cl.
*G02F 1/29* (2006.01)
*G02F 1/1335* (2006.01)
(Continued)

(52) U.S. Cl.
CPC .......... *G02F 1/29* (2013.01); *G02F 1/133371* (2013.01); *G02F 1/133526* (2013.01);
(Continued)

(58) Field of Classification Search
CPC . G02F 1/29; G02F 1/13; G02F 1/1343; G02F 1/133526; G02F 2001/133368; G02F 1/1313; G02F 1/134309; G02F 1/133371
See application file for complete search history.

(56) References Cited

U.S. PATENT DOCUMENTS

2007/0052920 A1\* 3/2007 Stewart .................... G02C 7/06
351/159.44
2007/0146625 A1\* 6/2007 Ooi .......................... G02B 3/08
349/200
(Continued)

FOREIGN PATENT DOCUMENTS

CN 101806967 A 8/2010
CN 105929619 A 9/2016
(Continued)

OTHER PUBLICATIONS

Search Report and Written Opinion for International Application No. PCT/CN2017/092175 dated Sep. 29, 2017.

*Primary Examiner* — Nathanael R Briggs
(74) *Attorney, Agent, or Firm* — Calfee, Halter & Griswold, LLP

(57) ABSTRACT

Disclosed is a lens device, including: a first transparent substrate; a second transparent substrate; and a liquid crystal layer filled therebetween. The first transparent substrate is a Fresnel lens, and a surface of the Fresnel lens toward the liquid crystal layer is disposed with grooves which are spaced from one another in accordance with Fresnel wave zones. The second transparent substrate is configured to control state of a liquid crystal, such that a refractive index of the liquid crystal, when polarized light incident into the liquid crystal passes through the liquid crystal, transforms between a first refractive index of the liquid crystal and a second refractive index of the liquid crystal, wherein the first refractive index is greater than the second refractive index, (Continued)

and a refractive index of the Fresnel lens is substantially equal to the first refractive index of the liquid crystal in the liquid crystal layer.

18 Claims, 3 Drawing Sheets

(51) Int. Cl.
*G02F 1/1333* (2006.01)
*G02F 1/1343* (2006.01)
*G02F 1/13* (2006.01)

(52) U.S. Cl.
CPC ...... *G02F 1/134309* (2013.01); *G02F 1/1313* (2013.01); *G02F 2001/133368* (2013.01)

(56) References Cited

U.S. PATENT DOCUMENTS

2013/0063691 A1* 3/2013 Takama ............... G02F 1/13394
　　　　　　　　　　　　　　　　　　　349/143
2015/0168756 A1　　6/2015 Cho et al.
2016/0011564 A1* 1/2016 Tanabe ................ G02F 1/13471
　　　　　　　　　　　　　　　　　　　359/11

FOREIGN PATENT DOCUMENTS

| CN | 106226930 A | 12/2016 |
|---|---|---|
| CN | 205992098 U | 3/2017 |
| JP | 2010224424 A | 10/2010 |

\* cited by examiner

LENS DEVICE

CROSS-REFERENCE

The present application is based upon International Application No. PCT/CN2017/092175, filed on Jul. 7, 2017, which claims priority to Chinese Patent Application No. 201610811703.1, filed on Sep. 8, 2016, and the entire contents thereof are incorporated herein by reference.

TECHNICAL FIELD

The present disclosure relates to a field of optical device, particularly to a lens device.

BACKGROUND

Lens is a common optical element in an optical device. With the development of optical technology, the requirements for lenses are increasing. Fresnel lens, as a lens with small volume, light weight and easy for reproduction, is widely used in various optical devices.

Fresnel lens in the existing optical device may only converge light, and in some scenarios, for example, when the Fresnel lens is employed to generate heat by converging sun light so as to obtain solar energy, it is needed to adjust temperature. If the Fresnel lens converges light all the time, it is continuously performed for heating only and it is hard to adjust temperature. Therefore, there are limitations for application of the existing Fresnel lens.

SUMMARY

The embodiments of the present disclosure provide a lens device, including: a first transparent substrate; a second transparent substrate; and a liquid crystal layer filled between the first transparent substrate and the second transparent substrate. The first transparent substrate is a Fresnel lens, and a surface of the Fresnel lens toward the liquid crystal layer is disposed with grooves which are spaced from one another in accordance with Fresnel wave zones. The second transparent substrate is configured to control state of a liquid crystal, such that a refractive index of the liquid crystal, when polarized light incident into the liquid crystal passes through the liquid crystal, transforms between a first refractive index of the liquid crystal and a second refractive index of the liquid crystal, wherein the first refractive index is greater than the second refractive index, and a refractive index of the Fresnel lens is substantially equal to the first refractive index of the liquid crystal in the liquid crystal layer.

According to an embodiment of the present disclosure, the liquid crystal is a rod-like liquid crystal, and an initial alignment direction of a longitudinal axis of the liquid crystal is parallel to the first transparent substrate, and is perpendicular or parallel to a polarization direction of the polarized light. The second transparent substrate is configured to control the longitudinal axis of the liquid crystal to transform between the initial alignment direction and a control direction, and the control direction of the longitudinal axis of the liquid crystal is parallel to the first transparent substrate and is perpendicular to the initial alignment direction.

According to an embodiment of the present disclosure, the lens device further includes a polarizer, which is disposed on a light-entering surface of the lens device, and a transmission axis of which is perpendicular or parallel to the initial alignment direction of the longitudinal axis of the liquid crystal.

According to an embodiment of the present disclosure, the second transparent substrate includes: a transparent substrate; and a first transparent electrode layer, a transparent insulating layer and a second transparent electrode layer which are disposed on the transparent substrate in sequence.

According to an embodiment of the present disclosure, the second transparent electrode layer includes a plurality of strip electrodes which are spaced from one another in parallel, and a longitudinal direction of the strip electrode is parallel to the initial alignment direction of the longitudinal axis of the liquid crystal.

According to an embodiment of the present disclosure, the liquid crystal is a blue phase liquid crystal. The second transparent substrate is configured to control the blue phase liquid crystal to transform between a spheroidal liquid crystal and a rod-like liquid crystal, and a longitudinal axis direction of the rod-like liquid crystal is parallel to the first transparent substrate and is perpendicular or parallel to a polarization direction of the polarized light.

According to an embodiment of the present disclosure, the lens device further includes a polarizer, which is disposed on a light-entering surface of the lens device and a transmission axis of which is perpendicular or parallel to the longitudinal axis direction of the rod-like liquid crystal.

According to an embodiment of the present disclosure, the second transparent substrate includes: a transparent substrate; and a first transparent electrode layer, a transparent insulating layer and a second transparent electrode layer which are disposed on the transparent substrate in sequence.

According to an embodiment of the present disclosure, the second transparent electrode layer includes a plurality of strip electrodes which are spaced from one another in parallel, and a longitudinal direction of the strip electrode is perpendicular to the longitudinal axis direction of the rod-like liquid crystal.

According to an embodiment of the present disclosure, the first transparent electrode layer is an ITO thin film layer or an IZO thin film layer, and the second transparent electrode layer is the ITO thin film layer or the IZO thin film layer.

According to an embodiment of the present disclosure, a step is disposed within the groove.

According to an embodiment of the present disclosure, when at least two steps are disposed within the groove, the at least two steps are gradually raised along a direction from the groove to the center of the Fresnel lens.

According to an embodiment of the present disclosure, the number of the steps within each of the grooves is N, wherein $N=2^m-1$, m is a positive integer and a phase difference of light passing adjacent steps is $2\pi/(N+1)$.

According to an embodiment of the present disclosure, a height of each of the steps is defined in the following equation:

$$h = \frac{\lambda/(N+1)}{n_1 - n_2};$$

wherein h is the height of the step, $\lambda$ is wavelength, $n_1$ is the first refractive index of the liquid crystal, and $n_2$ is the second refractive index of the liquid crystal.

According to an embodiment of the present disclosure, a width of the step within a jth groove is defined in the following equation:

$$t_j = \frac{d_j}{(N+1)/2};$$

wherein $t_j$ is the width of the step within the jth groove, j is a serial number of the groove along an outward direction from the center of the Fresnel lens, and $d_j$ is a width of a wave zone of the Fresnel wave zone corresponding to the jth groove.

A width of a jth pattern in the Fresnel lens is defined in the following equation:

$$T_j = D_j - \sum_{i=1}^{m-1} \frac{d_j}{2^i};$$

wherein $T_j$ is the width of the jth pattern, the pattern is an annulus between two grooves or a circle between a first groove and the center of the Fresnel lens, a width of the circle is a radius of the circle, j is a serial number of the pattern along the outward direction from the center of the Fresnel lens, and $D_j$ is a width of the wave zone of the Fresnel wave zone corresponding to the jth pattern.

According to an embodiment of the present disclosure, the lens device includes one polarizer disposed on the first transparent substrate or the second transparent substrate, or includes two polarizers disposed on the first transparent substrate and the second transparent substrate respectively.

According to an embodiment of the present disclosure, the lens device further includes a driving circuit electrically connected to the first transparent electrode layer and the second transparent electrode layer.

BRIEF DESCRIPTION OF THE DRAWINGS

In order to explain the technical solutions provided by embodiments of the present disclosure more clearly, the drawings, which is to be used in the description of the embodiments, will be described briefly. It is apparent that the following drawings are merely some embodiments of the present disclosure, and without paying any creative labor, other drawings can be obtained according to these drawings by those skilled in the art.

DETAILED DESCRIPTION

In order to make objectives, technical solutions and advantages of the present disclosure more clearly, the embodiments of the present disclosure will be further described in detail in conjunction with the drawings.

Figure 1:
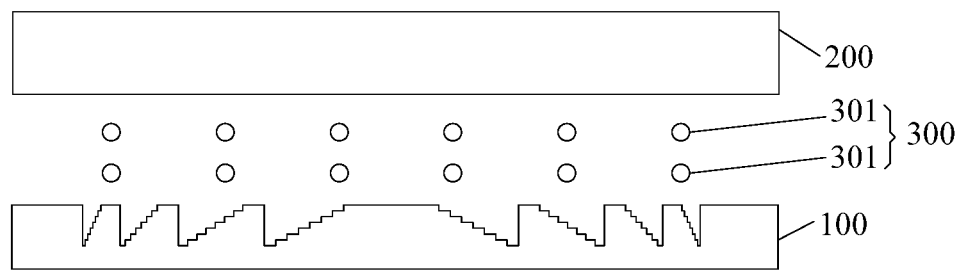
FIG. 1 is a schematic diagram illustrating a structure of a lens device according to an embodiment of the present disclosure.

FIG. 1 is a schematic diagram illustrating a structure of a lens device according to an embodiment of the present disclosure. Referring to FIG. 1, the lens device includes: a first transparent substrate 100; a second transparent substrate 200; and a liquid crystal layer 300 filled between the first transparent substrate 100 and the second transparent substrate 200. The first transparent substrate 100 is a Fresnel lens 100, and a surface of the Fresnel lens 100 toward the liquid crystal layer 300 is disposed with grooves 101 which are spaced from one another in accordance with Fresnel wave zones. The second transparent substrate 200 is used to control state of a liquid crystal 301, such that a refractive index of the liquid crystal 301, when polarized light incident into the liquid crystal 301 passes through the liquid crystal 301, transforms between a first refractive index of the liquid crystal 301 and a second refractive index of the liquid crystal 301. The first refractive index is greater than the second refractive index, and a refractive index of the Fresnel lens 100 is substantially equal to the first refractive index of the liquid crystal 301 in the liquid crystal layer 100.

Here, the Fresnel wave zones include a circle at the center thereof and a plurality of annuli concentric with the circle. Each of the circle and the annuli is a wave zone of the Fresnel wave zones. The groove of the Fresnel lens 100 corresponds to the wave zone of the Fresnel wave zones, and adjacent grooves correspond to the wave zones spaced from one another in the Fresnel wave zones. The specific correspondence may be referred to the following detailed description of the grooves.

In the lens device provided by the present disclosure, when the refractive index of the liquid crystal 301, when polarized light incident into the liquid crystal 301 passes through the liquid crystal 301, is the second refractive index of the liquid crystal 301 under the control of the second transparent substrate 200, since the refractive index of the Fresnel lens 100 through which the polarized light passes is substantially equal to the first refractive index of the liquid crystal 301, and the first refractive index of the liquid crystal 301 is greater than the second refractive index of the liquid crystal 301, the liquid crystals 301 filled within the grooves 301 function similarly as air, with no effect on the function of the Fresnel lens 301. Therefore, the Fresnel lens 100 and the liquid crystal 301 converge light. When the refractive index of the liquid crystal 301, when the polarized light incident into the liquid crystal 301 passes through the liquid crystal 301, is the first refractive index of the liquid crystal 301 under the control of the second transparent substrate 200, since the refractive index of the Fresnel lens 100 through which the polarized light passes is substantially equal to the first refractive index of the liquid crystal 301, the refractive index of the liquid crystal 301 filled within the grooves 101 of the Fresnel lens 100 is the same as that of the material of Fresnel lens 100, which is equivalent to that the grooves 101 of the Fresnel lens 100 are filled up, and thus the combination of the Fresnel lens 100 and the liquid crystals 301 is equivalent to a flat glass which has a transmission function. To sum up, transformation between converging light and transmitting light in the Fresnel lens 100 can be realized by controlling the state of liquid crystal 301 with the second transparent substrate 200 according to the embodiment of the present disclosure.

Figure 2A:
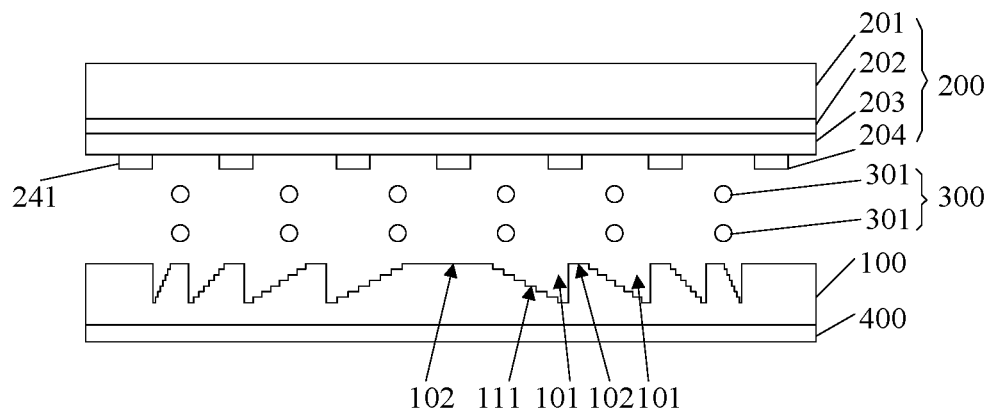
FIGS. 2A and 2B are schematic diagrams illustrating a structure of another lens device according to an embodiment of the present disclosure.
Figure 2B:
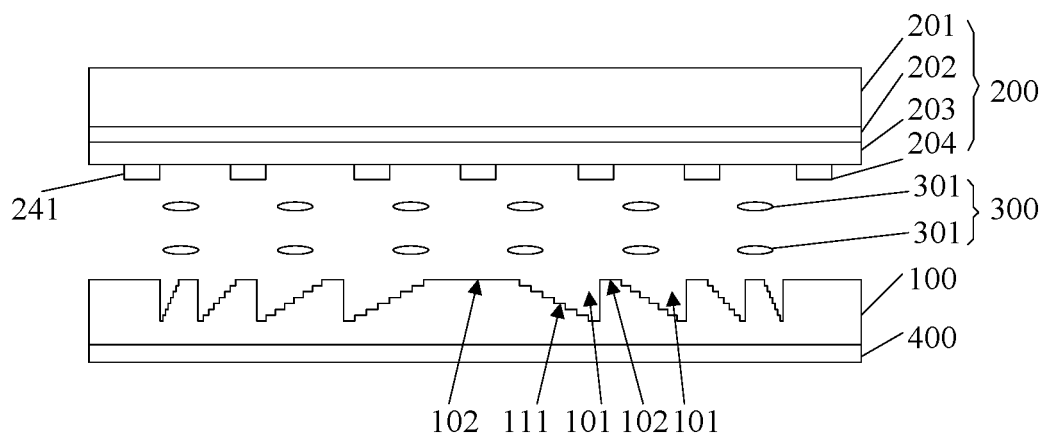

FIGS. 2A and 2B are schematic diagrams illustrating a structure of another lens device according to an embodiment of the present disclosure. The liquid crystal 301 in the lens device is a rod-like liquid crystal. The initial alignment direction of the longitudinal axis of the liquid crystal 301 is parallel to the first transparent substrate 100 and is perpendicular to the polarization direction of the polarized light. For example, as shown in FIG. 2A, the longitudinal axis direction of the liquid crystal 301 is the initial alignment direction and the polarization direction of the polarized light is a left-right direction. The initial alignment direction of the longitudinal axis of the liquid crystal 301 in FIG. 2A is perpendicular to the polarization direction of the polarized light. The second transparent substrate 200 is used for controlling the longitudinal axis of the liquid crystal 301 to transform between the initial alignment direction and a control direction of the longitudinal axis of the liquid crystal 301, and the control direction is parallel to the first transparent substrate 100 and is perpendicular to the initial alignment direction. For example, as shown in FIG. 2B, the control direction of liquid crystal 301 is perpendicular to the initial alignment direction. When the longitudinal axis direction of the liquid crystal is perpendicular to the polarization direction of the polarized light, the refractive index of the liquid crystal through which the polarized light passes is an ordinary light refractive index $n_o$ of the liquid crystal, and the Fresnel lens and the liquid crystals converge light. When the longitudinal axis direction of the liquid crystal is parallel to the polarization direction of the polarized light, the refractive index of the liquid crystal through which the polarized light passes is an extraordinary light refractive index $n_e$ of the liquid crystal, and a combination of the Fresnel lens and the liquid crystals is equivalent to a flat glass, which has a transmission function. In this embodiment, the first refractive index of liquid crystal is the extraordinary light refractive index $n_e$ of liquid crystal, and the second refractive index of liquid crystal is the ordinary light refractive index $n_o$ of liquid crystal.

Here, the ordinary light of the liquid crystal refers to the polarized light with the polarization direction perpendicular to the longitudinal axis of the liquid crystal 301, and the extraordinary light of the liquid crystal refers to the polarized light with the polarization direction parallel to the longitudinal axis of the liquid crystal 301.

Still referring to FIG. 2, the lens device may further include a polarizer 400. The polarizer 400 is disposed on a light-entering surface of the lens device, and a transmission axis of the polarizer 400 is perpendicular to the initial alignment direction of the longitudinal axis of the liquid crystal 301. After passing through the polarizer, the light emitted from natural light source or artificial light source becomes the polarized light, and then enters into the Fresnel lens and liquid crystals.

Here, the transmission axis of the polarizer 400 refers to an axis that is parallel to the polarization direction of the polarized light capable of passing through the polarizer.

In another embodiment, the initial alignment direction of the longitudinal axis of the liquid crystal 301 may be parallel to the polarization direction of the polarized light. In this case, the transmission axis of the polarizer 400 is parallel to the initial alignment direction of the longitudinal axis of the liquid crystal 301.

In the device as shown in FIG. 2A (or FIG. 2B), a step 111 may be disposed in the groove 101. The number of the steps 111 may be set as needed. The more steps 111, the better effect of converging light may be obtained, however the more complicated the manufacturing process is. Preferably, the number of the steps 111 may be 3, 7 or 15.

Specifically, when at least two steps 111 are disposed within the groove 101, the at least two steps 111 are gradually raised along a direction from the grooves 101 to the center of the Fresnel lens 100.

In the device as shown in FIG. 2A (or FIG. 2B), seven steps are disposed within each of the grooves 101.

In an embodiment of the present disclosure, the respective grooves in each of the Fresnel lens include the same number of steps. Specifically, the number of the steps 111 within each groove 101 is N, wherein $N=2^m-1$, m is a positive integer and a phase difference of light passing adjacent steps 111 is $2\pi/(N+1)$.

Figure 3:
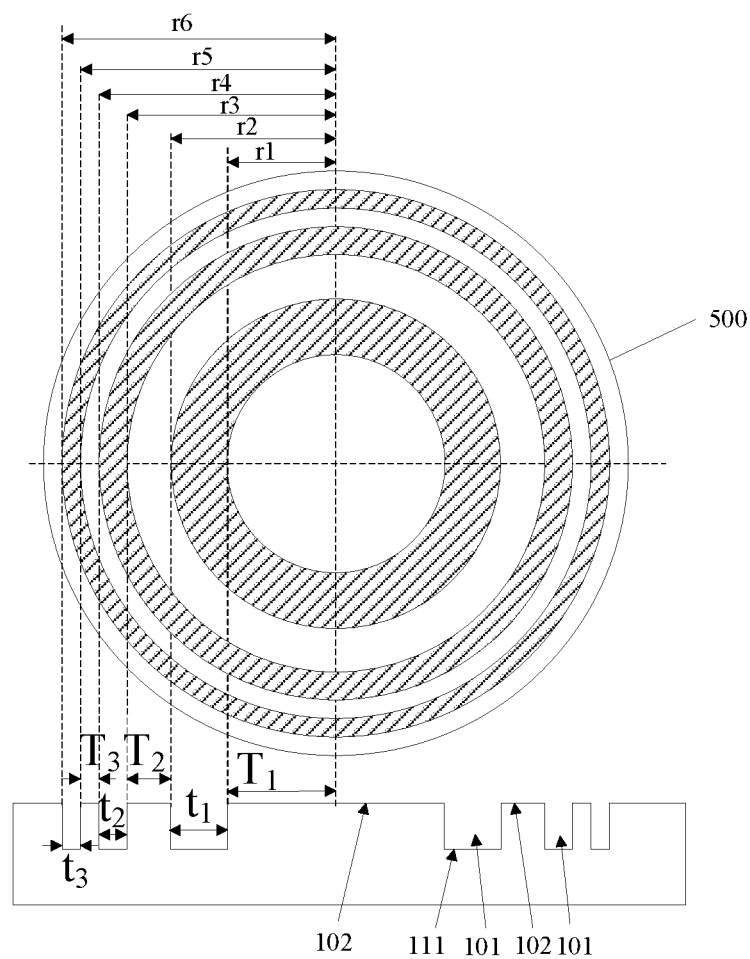
FIGS. 3 to 5 are schematic diagrams illustrating three structures of Fresnel lenses with different numbers of the steps according to an embodiment of the present disclosure.
Figure 4:
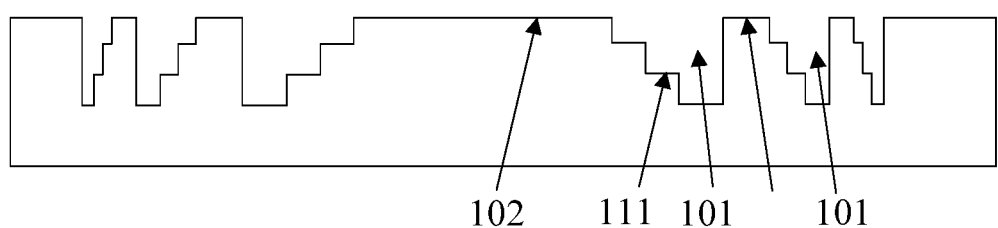
Figure 5:
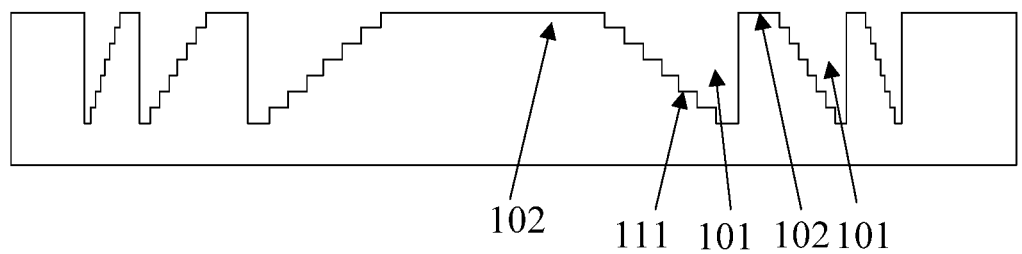

FIGS. 3 to 5 are schematic diagrams illustrating three structures of Fresnel lenses with different numbers of steps, in which the numbers of the steps are 1, 3 and 7 respectively.

In an embodiment of the present disclosure, all the steps within each groove have the same height, and the steps within the respective grooves have the same height as well. Specifically, the height of each of the steps 111 is defined in the following equation:

$$h = \frac{\lambda/(N+1)}{n_1 - n_2};$$

wherein h is the height of each of the steps 111, $\lambda$ is wavelength, $n_1$ is the first refractive index of the liquid crystal 301 (i.e., the refractive index of the Fresnel lens 100), and $n_2$ is the second refractive index of the liquid crystal 301.

By setting the height of the step in accordance with such height, it is ensured that the Fresnel lens may still function as a lens after the grooves are filled up with liquid crystals.

In an embodiment of the present disclosure, all steps within each groove have the same width, the steps within the different grooves have the different widths, and the closer to the center of the Fresnel lens, the greater the step has the width. Specifically, the width of the step 111 within a jth groove 101 is defined in the following equation:

$$t_j = \frac{d_j}{(N+1)/2};$$

wherein $t_j$ is the width of the step 111 within the jth groove 101, j is a serial number of the groove 101 along an outward direction from the center of the Fresnel lens 100, and $d_j$ is a width of a wave zone of the Fresnel wave zone corresponding to the jth groove 101. For example, as shown in FIG. 3, the first groove corresponds to the second wave zone of Fresnel wave zones, the second groove corresponds to the fourth wave zone of Fresnel wave zones, the third groove corresponds to the sixth wave zone of Fresnel wave zones and so on.

A width of a jth pattern 102 in the Fresnel lens is defined in the following equation:

$$T_j = D_j - \sum_{i=1}^{m-1} \frac{d_j}{2^i};$$

wherein $T_j$ is the width of the jth pattern 102, the pattern 102 is an annulus between two grooves 101 or a circle between a first groove 101 and the center of the Fresnel lens 100, the width of the pattern 102 is a width of the annulus or a radius of the circle, j is a serial number of the pattern 102 along the outward direction from the center of the Fresnel lens 100, and $D_j$ is a width of the wave zone of the Fresnel wave zone corresponding to the jth pattern 102. For example, as shown in FIG. 3, the first pattern corresponds to the first wave zone (i.e., the circle at the center of the Fresnel wave zones) of the Fresnel wave zones, the second pattern corresponds to the third wave zone of the Fresnel wave zones, the third pattern corresponds to the fifth wave zone of the Fresnel wave zones and so on.

Here, the widths $d_j$ and $D_j$ of wave zones of the Fresnel wave zones are related to the radius of the circle of the Fresnel wave zones. For example, as shown in FIG. 3, the widths $D_1$, $D_2$ and $D_3$ of the wave zones of the Fresnel wave zones corresponding to the first, second and third patterns are r1, r3-r2 and r5-r4 respectively, and the widths $d_1$, $d_2$ and $d_3$ of the wave zones of the Fresnel wave zones corresponding to the first, second and third grooves are r2-r1, r4-r3, r6-r5 respectively. Here, r1-r6 is the radius of the circles in the Fresnel wave zones.

Here, the radius of the circle in the Fresnel wave zones is defined in the following equation:

$$r_i = \sqrt{if\lambda};$$

wherein $r_i$ is the radius of the circle in the Fresnel wave zones, i is the serial number of the circle in the Fresnel wave zones (i is gradually increased along the outward direction from the center of the Fresnel wave zones), f is a focal length of the Fresnel lens, and $\lambda$ is wavelength (which is typically selected to be sensitive to human eyes, such as 440 nm).

In addition, as shown in FIG. 3, when N=1, the widths $T_1$, $T_2$ and $T_3$ of the first, second and third patterns are r1, r3-r2 and r5-r4 respectively, and the widths $t_1$, $t_2$ and $t_3$ of the first, second and third grooves are r2-r1, r4-r3 and r6-r5 respectively.

By setting the widths of the steps and the patterns according to the above widths, it is ensured that the light can be focused on the center of the Fresnel lens.

Still referring to FIGS. 2A and 2B, the second transparent substrate 200 includes: a transparent substrate 201; and a first transparent electrode layer 202, a transparent insulating layer 203 and a second transparent electrode layer 204 which are disposed on the transparent substrate 201 in sequence. The deflection angle of the liquid crystal is controlled by powering the first transparent electrode layer and the second transparent electrode layer. The substrates, electrode layers and insulating layers are provided to be transparent so as to avoid affecting the refractive index of Fresnel lens.

Still referring to FIGS. 2A and 2B, the second transparent electrode layer 204 includes a plurality of strip electrodes 241 which are spaced from one another in parallel, and a longitudinal direction of the strip electrode 241 is perpendicular to the initial alignment direction of the longitudinal axis of the liquid crystal 301. Since the second transparent electrode layer includes a plurality of strip electrodes which are spaced from one another in parallel, and the longitudinal direction of the strip electrode is perpendicular to the initial alignment direction of the longitudinal axis of the liquid crystal, it may be ensured that a horizontal electrical field is produced when powering the first transparent electrode layer and the second transparent electrode layer, thereby deflecting the liquid crystal under the control of the electrical field and thus changing the state of the liquid crystal.

Figure 6:
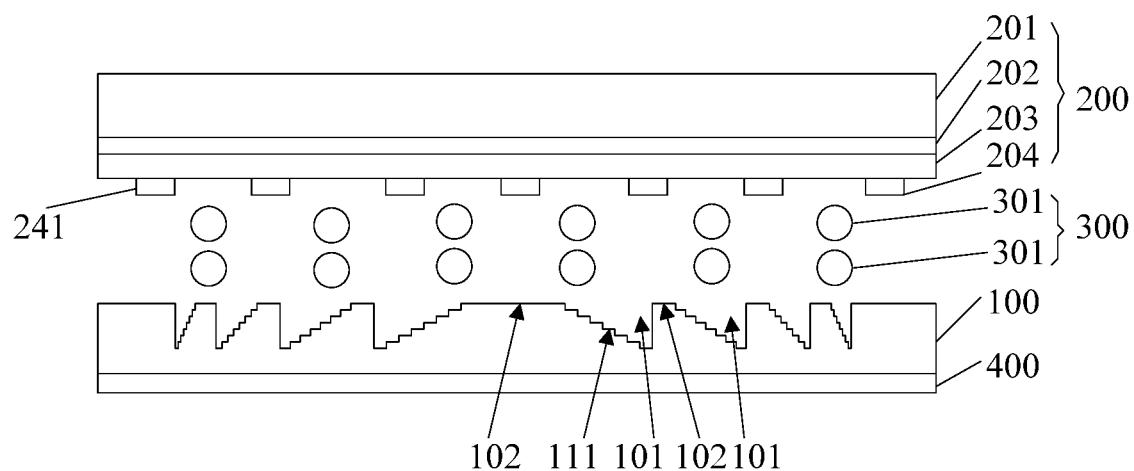
FIG. 6 is a schematic diagram illustrating a structure of another lens device according to an embodiment of the present disclosure.

FIG. 6 is a schematic diagram illustrating a structure of another lens device according to an embodiment of the present disclosure. Referring to FIG. 6, the liquid crystal 301 in the lens device is a blue phase liquid crystal. The second transparent substrate 200 is used to control the blue phase liquid crystal to transform between a spheroidal liquid crystal and a rod-like liquid crystal, and a longitudinal axis direction of the rod-like liquid crystal is parallel to the first transparent substrate 100 and is perpendicular or parallel to a polarization direction of the polarized light. The blue phase liquid crystal as the spheroidal liquid crystal is isotropic. The refractive indexes in respective directions of the spheroidal liquid crystal are the same, and the refractive index of the spheroidal liquid crystal through which polarized light passes is n. When the blue phase liquid crystal is the rod-like liquid crystal, the ordinary light refractive index of the rod-like liquid crystal is $n_o$, and the extraordinary light refractive index of the rod-like liquid crystal is $n_e$, wherein $n_o < n < n_e$.

In an embodiment, the first refractive index of the blue phase liquid crystal is n and the second refractive index thereof is $n_o$, and the longitudinal axis direction of the rod-like liquid crystal is perpendicular to the polarization direction of the polarized light. That is to say, when the blue phase liquid crystal is the spheroidal liquid crystal, the refractive index of the spheroidal liquid crystal through which the polarized light passes is substantially equal to the refractive index of Fresnel lens, and in this case, the combination of the Fresnel lens and the liquid crystals functions as a flat glass which has a transmission function. When the blue phase liquid crystal is the rod-like liquid crystal, the polarization direction of polarized light is perpendicular to the longitudinal axis direction of the rod-like liquid crystal, and the refractive index of rod-like liquid crystal through which the polarized light passes is less than the refractive index of Fresnel lens, and thus the combination of the Fresnel lens and the liquid crystals functions as a lens for converging light.

In another embodiment, the first refractive index of blue phase liquid crystal is $n_e$ and the second refractive index thereof is n, and the longitudinal axis direction of the rod-like liquid crystal is parallel to the polarization direction of the polarized light. That is to say, when the blue phase liquid crystal is the spheroidal liquid crystal, the refractive index of spheroidal liquid crystal through which the polarized light passes is less than the refractive index of Fresnel lens, and at this time, the combination of the Fresnel lens and the liquid crystals functions as a lens for converging light. When the blue phase liquid crystal is the rod-like liquid crystal, the polarization direction of polarized light is parallel to the longitudinal axis direction of the rod-like liquid crystal, and the refractive index of rod-like liquid crystal through which the polarized light passes is substantially equal to the refractive index of Fresnel lens, and thus the combination of the Fresnel lens and the liquid crystals functions as a flat glass has the transmission function.

Still referring to FIG. 6, the lens device may further include a polarizer 400. The polarizer 400 is disposed on a light-entering surface of the lens device, and a transmission axis of the polarizer 400 is perpendicular or parallel to the longitudinal axis direction of the rod-like liquid crystal. After passing through the polarizer, the light becomes the polarized light and then enters into the Fresnel lens and liquid crystals.

Still referring to FIG. 6, the second transparent substrate 200 includes: a transparent substrate 201; and a first transparent electrode layer 202, a transparent insulating layer 203 and a second transparent electrode layer 204 which are disposed on the transparent substrate 201 in sequence. The deflection angle of the liquid crystal is controlled by powering the first transparent electrode layer and the second transparent electrode layer. The substrates, electrode layers and insulating layers are provided to be transparent so as to avoid affecting the refractive index of Fresnel lens.

Still referring to FIG. 6, the second transparent electrode layer 204 includes a plurality of strip electrodes 241 which are spaced from one another in parallel, and a longitudinal direction of the strip electrode 241 is perpendicular to the longitudinal axis direction of the liquid crystal 301 (the structure of the blue phase liquid crystal as the rod-like liquid crystal is the same as that in FIG. 2B). Since the second transparent electrode layer includes a plurality of strip electrodes which are spaced from one another in parallel, and the longitudinal direction of the strip electrode is perpendicular to the longitudinal axis direction of the rod-like liquid crystal, it is ensured, under the control of the electrical field of the first transparent electrode layer and the second transparent electrode layer, that it is transformed between the spheroidal liquid crystal and the rod-like liquid crystal, and that the longitudinal axis direction of the rod-like liquid crystal is perpendicular to the polarization direction of the polarized light.

In the lens device as shown in FIG. 2A (or FIG. 2B) and FIG. 6, the first transparent electrode layer 202 includes but is not limited to indium tin oxide (ITO) thin film layer or indium zinc oxide (IZO) thin film layer, and the second transparent electrode layer 204 is ITO thin film layer or IZO thin film layer, thus the transparency of the electrode layers can be ensured.

In the lens device as shown in FIG. 2A (or FIG. 2B) and FIG. 6, the polarizer 400 is disposed at the side of the first transparent substrate 100. In other embodiments, the polarizer 400 may be disposed on the second transparent substrate 200, or the polarizers 400 are disposed on the first transparent substrate 100 and the second transparent substrate 200 respectively. Fresnel lens could be realized with the above manners. When one polarizer is disposed, it may be defined that the light may enter merely from one side of the device. When two polarizers are disposed, the light may enter from two sides.

In embodiments of the present disclosure, the lens device may further a driving circuit. The driving circuit is electrically connected to the first transparent electrode layer 202 and the second transparent electrode layer 204. By powering the first transparent electrode layer and the second transparent electrode layer with the driving circuit, the transformation between converging light and transmitting light can be realized for Fresnel lens 100. The driving circuit may be realized by an integrated circuit.

The above is merely specific embodiments of the present disclosure and does not intend to limit the present disclosure. Any modifications, alternations, variations or the like made within the spirit and principle of the present disclosure should fall in the protection scope of the present disclosure.

What is claimed is:

1. A lens device, comprising:
a first transparent substrate;
a second transparent substrate; and
a liquid crystal layer, filled between the first transparent substrate and the second transparent substrate,
wherein the first transparent substrate is a Fresnel lens, and a surface of the Fresnel lens toward the liquid crystal layer is disposed with grooves which are spaced from one another in accordance with Fresnel wave zones;
wherein the second transparent substrate is configured to control state of a liquid crystal, such that a refractive index of the liquid crystal, when polarized light incident into the liquid crystal passes through the liquid crystal, transforms between a first refractive index of the liquid crystal and a second refractive index of the liquid crystal, wherein the first refractive index is greater than the second refractive index, and a refractive index of the Fresnel lens is substantially equal to the first refractive index of the liquid crystal in the liquid crystal layer; and
wherein at least two of steps are disposed in each of the grooves and comprise a first step and a second step, and the second step is disposed closer to a center of the Fresnel lens than the first step and has a height higher than that of the first step,
wherein the liquid crystal is a rod-like liquid crystal, and an initial alignment direction of a longitudinal axis of the liquid crystal is parallel to the first transparent substrate, and is perpendicular or parallel to a polarization direction of the polarized light, and wherein the second transparent substrate is configured to control the longitudinal axis of the liquid crystal to transform between the initial alignment direction and a control direction, and the control direction of the longitudinal axis of the liquid crystal is parallel to the first transparent substrate and is perpendicular to the initial alignment direction,
wherein the lens device further comprises a polarizer disposed on a light-entering surface of the lens device, and a transmission axis of the polarizer is perpendicular or parallel to the initial alignment direction of the longitudinal axis of the liquid crystal.

2. The lens device according to claim 1, wherein the second transparent substrate comprises:
a transparent substrate; and
a first transparent electrode layer, a transparent insulating layer and a second transparent electrode layer which are disposed on the transparent substrate in sequence.

3. The lens device according to claim 2, wherein the second transparent electrode layer comprises a plurality of strip electrodes spaced from one another in parallel, wherein a longitudinal direction of the strip electrode is parallel to the initial alignment direction of the longitudinal axis of the liquid crystal.

4. A lens device, comprising:
a first transparent substrate;
a second transparent substrate; and
a liquid crystal layer, filled between the first transparent substrate and the second transparent substrate,
wherein the first transparent substrate is a Fresnel lens, and a surface of the Fresnel lens toward the liquid crystal layer is disposed with grooves which are spaced from one another in accordance with Fresnel wave zones;
wherein the second transparent substrate is configured to control state of a liquid crystal, such that a refractive index of the liquid crystal, when polarized light incident into the liquid crystal passes through the liquid crystal, transforms between a first refractive index of the liquid crystal and a second refractive index of the liquid crystal, wherein the first refractive index is greater than the second refractive index, and a refractive index of the Fresnel lens is substantially equal to the first refractive index of the liquid crystal in the liquid crystal layer; and
wherein at least two of steps are disposed in each of the grooves and comprise a first step and a second step, and the second step is disposed closer to a center of the Fresnel lens than the first step and has a height higher than that of the first step, wherein the liquid crystal is a blue phase liquid crystal, wherein the second transparent substrate is configured to control the blue phase liquid crystal to transform between a spheroidal liquid crystal and a rod-like liquid crystal, and a longitudinal axis direction of the rod-like liquid crystal is parallel to the first transparent substrate and is perpendicular or parallel to a polarization direction of the polarized light, wherein the lens device further comprises a polarizer disposed on a light-entering surface of the lens device, and a transmission axis of the polarizer is perpendicular or parallel to the longitudinal axis direction of the rod-like liquid crystal.

5. The lens device according to claim 4, wherein the second transparent substrate comprises:

a transparent substrate; and a first transparent electrode layer, a transparent insulating layer and a second transparent electrode layer which are disposed on the transparent substrate in sequence.

6. The lens device according to claim 5, wherein the second transparent electrode layer comprises a plurality of strip electrodes spaced from one another in parallel, wherein a longitudinal direction of the strip electrode is perpendicular to the longitudinal axis direction of the rod-like liquid crystal.

7. The lens device according to claim 2, wherein the first transparent electrode layer and the second transparent electrode layer comprise one of an indium tin oxide (ITO) thin film layer and an indium zinc oxide (IZO) thin film layer.

8. The lens device according to claim 1, wherein the number of the steps within the groove is N, wherein $N=2^m-1$, m is a positive integer and a phase difference of light passing adjacent steps is $2\pi/(N+1)$.

9. The lens device according to claim 8, wherein a height of each of the steps is defined in the following equation:

$$h = \frac{\lambda/(N+1)}{n_1 - n_2};$$

wherein h is the height of the step, $\lambda$ is wavelength, $n_1$ is the first refractive index of the liquid crystal, and $n_2$ is the second refractive index of the liquid crystal.

10. The lens device according to claim 8, wherein a width of the step within a jth groove is defined in the following equation:

$$t_j = \frac{d_j}{(N+1)/2};$$

wherein $t_j$ is the width of the step within the jth groove, j is a serial number of the groove along an outward direction from the center of the Fresnel lens, and $d_j$ is a width of a wave zone of the Fresnel wave zone corresponding to the jth groove;

a width of a jth pattern in the Fresnel lens is defined in the following equation:

$$T_j = D_j - \sum_{i=1}^{m-1} \frac{d_j}{2^i};$$

wherein $T_j$ is the width of the jth pattern, the pattern comprises an annulus between two grooves and a circle between a first groove and the center of the Fresnel lens, a width of the circle is a radius of the circle, j is a serial number of the pattern along the outward direction from the center of the Fresnel lens, and $D_j$ is a width of the wave zone of the Fresnel wave zone corresponding to the jth pattern.

11. The lens device according to claim 1, wherein the polarizer is disposed on at least one of the first transparent substrate and the second transparent substrate.

12. The lens device according to claim 1, further comprising a driving circuit electrically connected to the first transparent electrode layer and the second transparent electrode layer.

13. The lens device according to claim 4, wherein the polarizer is disposed on at least one of the first transparent substrate and the second transparent substrate.

14. The lens device according to claim 5, wherein the first transparent electrode layer and the second transparent electrode layer comprise one of an indium tin oxide (ITO) thin film layer and an indium zinc oxide (IZO) thin film layer.

15. The lens device according to claim 4, wherein the number of the steps within the groove is N, wherein $N=2^m-1$, m is a positive integer and a phase difference of light passing adjacent steps is $2\pi/(N+1)$.

16. The lens device according to claim 15, wherein a height of each of the steps is defined in the following equation:

$$h = \frac{\lambda/(N+1)}{n_1 - n_2};$$

wherein h is the height of the step, $\lambda$ is wavelength, $n_1$ is the first refractive index of the liquid crystal, and $n_2$ is the second refractive index of the liquid crystal.

17. The lens device according to claim 15, wherein a width of the step within a jth groove is defined in the following equation:

$$t_j = \frac{d_j}{(N+1)/2};$$

wherein $t_j$ is the width of the step within the jth groove, j is a serial number of the groove along an outward direction from the center of the Fresnel lens, and $d_j$ is a width of a wave zone of the Fresnel wave zone corresponding to the jth groove;

a width of a jth pattern in the Fresnel lens is defined in the following equation:

$$T_j = D_j - \sum_{i=1}^{m-1} \frac{d_j}{2^i};$$

wherein $T_j$ is the width of the jth pattern, the pattern comprises an annulus between two grooves and a circle between a first groove and the center of the Fresnel lens, a width of the circle is a radius of the circle, j is a serial number of the pattern along the outward direction from the center of the Fresnel lens, and $D_j$ is a width of the wave zone of the Fresnel wave zone corresponding to the jth pattern.

18. The lens device according to claim 4, further comprising a driving circuit electrically connected to the first transparent electrode layer and the second transparent electrode layer.

* * * * *